April 17, 1951      A. S. CHIPLEY      2,548,945
BLOWER WITH COMBINED AIR CLEANER
Filed Aug. 15, 1947
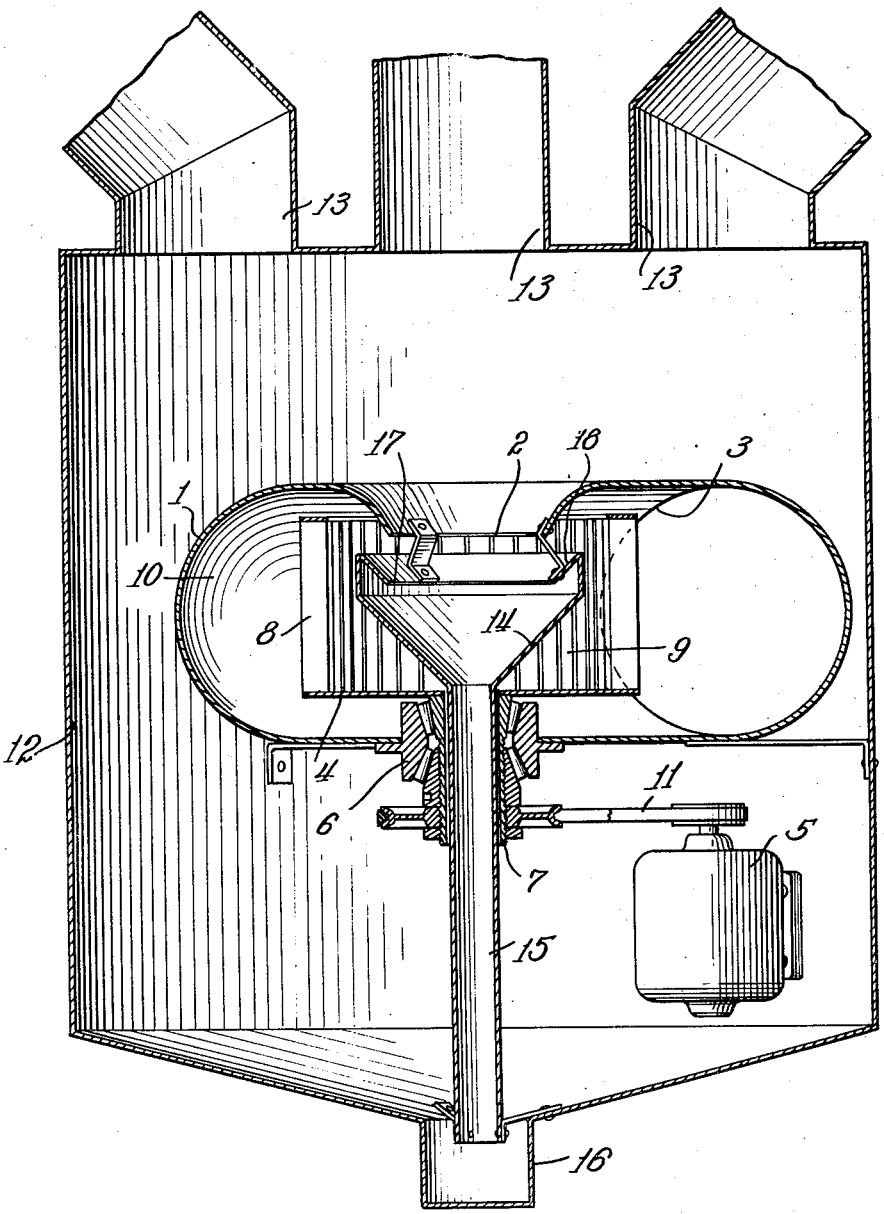
INVENTOR.
Alfred S. Chipley
BY Patented Apr. 17, 1951

2,548,945

UNITED STATES PATENT OFFICE 2,548,945

BLOWER WITH COMBINED AIR CLEANER

Alfred S. Chipley, Mundelein, Ill., assignor to Burgess-Manning Company, Libertyville, Ill., a corporation of Illinois Application August 15, 1947, Serial No. 768,736

4 Claims. (Cl. 183—37)

This invention relates to blowers and more particularly to centrifugal blowers having means combined therewith for separating solid or liquid particles from the air or other gases in which such particles are entrained as the air passes through the blower.

The principal object of the invention is to provide a centrifugal blower which incorporates as an integral part of the device an extremely simple and efficient particle separator which operates continuously without diminution of efficiency and without periodic servicing attention. A further object is to provide such a combination blower and cleaner which requires no more space than the blower alone and which may be fabricated at substantially no greater cost than that of the blower itself.

Further objects and the many advantages of the invention will appear as the description proceeds.

The accompanying drawing is a cross-sectional view of an exemplification of the invention.

Although specific details of construction of the widely used centrifugal blower vary considerably, the elemental features and mode of operation of different units are similar. Air is drawn into the blower housing at a central aperture, flowing first into the space surrounded by the impeller and then turning abruptly in direction to flow between the impeller vanes and thence to the discharge outlet. According to the invention, a dust trap or receptacle is mounted within the space enclosed by the impeller to receive and retain particles which tend to continue their forward movement after passage through the inlet aperture as the air stream spreads to flow laterally toward the impeller blades.

The essential elements of the blower-cleaner illustrated in the drawing include blower housing 1 having a central inlet aperture 2 and discharge port 3, an impeller 4, and an electric motor 5 or other suitable means for driving the rotary impeller. Housing 1 is suitably mounted in stationary position while impeller 4 is journaled at bearing 6 for high speed rotation with shaft 7. Impeller 4 includes a plurality of blades or vanes 8 which serve to move air from the space 9 within the impeller structure to space 10 outside of the impeller and within housing 1, as the impeller rotates. Motor 5 is operatively connected to shaft 7 by a belt and pulley system 11 or by other suitable means.

In the device illustrated in the drawing, the blower assembly thus described is enclosed within an outer casing 12 having three inlet ports 13.

Whereas power is ordinarily transmitted to the impeller of the blower by means of a solid shaft, a hollow shaft 7 is preferably employed in the combination cleaner-blower for the convenient mounting of the dust trap therein. A dust trap 14 is mounted within space 9, being supported by hollow shaft or spout 15 which opens into the bottom of the dust trap and extends through hollow shaft 7. The bottom end of spout 15 opens into a receptacle 16 of sufficient size to accommodate a reasonable accumulation of particles. This dust receptacle may be closed or may be open to the space within casing 12, as shown. If desired, spout 15 may be left open to the atmosphere. The dust trap and spout assembly is suitably supported by the stationary structure of the apparatus and is not permitted to rotate with the impeller.

Mouth 17 of dust trap 14 is in alignment with inlet aperture 2 and the dust trap structure is spaced from housing 1 at inlet aperture 2 to form an annular passageway for the air stream as it enters space 9. Inturned flange 18, forming a funnel-like approach to dust trap mouth 17, while not indispensable, is desirable to insure retention of particles in the dust trap. Particles entering the trap fall through spout 15 and are thus continuously removed.

In operation of the apparatus thus described, impeller 4 is caused to rotate with shaft or sleeve 7 at a high rate of speed. Vanes 8 tend to draw air from space 9, creating a suction which causes air to flow into the blower. Movement of air into the blower must be limited to passage through inlet aperture 2 as the inward flow of air through dust trap 14 would upset the system and render it inoperative.

In designing the apparatus, the relative sizes of inlet opening 2 and dust trap mouth 17 must be selected to insure preferential flow through the inlet opening. This greater effectiveness to the flow of air of the inlet opening may also be provided by suitably shaping the structural parts at the peripheries of these openings. For example, inlet opening 2 functions as a round-edged orifice and dust trap mouth 17 as a sharp-edged orifice with inherently poorer efficiency. Other known means may be employed to so determine the relative air flow efficiencies of the two passageways into the blower that the desired results may be obtained.

Immediately upon passage through inlet aperture 2, the air stream spreads and flows laterally through the annular space between housing 1 and dust trap 14 into space 9. Particles entrained in the air stream tend to project forwardly in the direction of the incoming stream through inlet aperture 2 and pass through dust trap mouth 17. Most particles of substantial density are thus removed from the air stream.

It is not possible to describe and illustrate the many possible variations of structure which may be employed in the manner herein described to simultaneously clean and move an air stream. Such modifications will be readily recognized as no more than the equivalent of the structure herein described in detail.

Invention is claimed as follows:

1. In combination with a centrifugal blower having a rotary vaned impeller enclosed within a housing having a central air inlet aperture opening into a space surrounded by said impeller vanes, a dust trap mounted within said space in spaced relation to said housing, said dust trap comprising a receptacle having a mouth disposed in alignment with said air inlet aperture.

2. In a centrifugal blower having a rotary vaned impeller enclosed within a housing having a central air inlet aperture opening into a space surrounded by said impeller vanes, a hollow shaft connected with said impeller for imparting rotary motion thereto, a dust trap disposed within said space in spaced relation to said housing, said dust trap comprising a receptacle having a mouth in alignment with said air inlet aperture, and a spout passing through said hollow shaft and opening into said receptacle.

3. Structure as defined by claim 2 wherein the spout is open to the atmosphere.

4. A combination air cleaner and centrifugal blower comprising a housing having a vertical axis of revolution, a rotary impeller disposed within said housing and comprising a plurality of impeller vanes collectively forming a cylindrical body defining a space therewithin, said housing having an air inlet aperture opening into said space, a hollow vertical shaft connected with said impeller for imparting rotary motion thereto, a dust trap disposed within said space in spaced relation to said housing, said dust trap comprising a receptacle having a mouth in alignment with said air inlet aperture, and a spout passing through said hollow shaft and opening into said receptacle at the bottom thereof.

ALFRED S. CHIPLEY.

REFERENCES CITED

The following references are of record in the file of this patent:

UNITED STATES PATENTS

| Number | Name | Date |
|--------|------|------|
| 861,634 | Burger | July 30, 1907 |